Feb. 8, 1944.        M. M. CUNNINGHAM        2,341,499
MOLDING APPARATUS AND METHOD OF MOLDING
Filed April 18, 1942        2 Sheets-Sheet 1
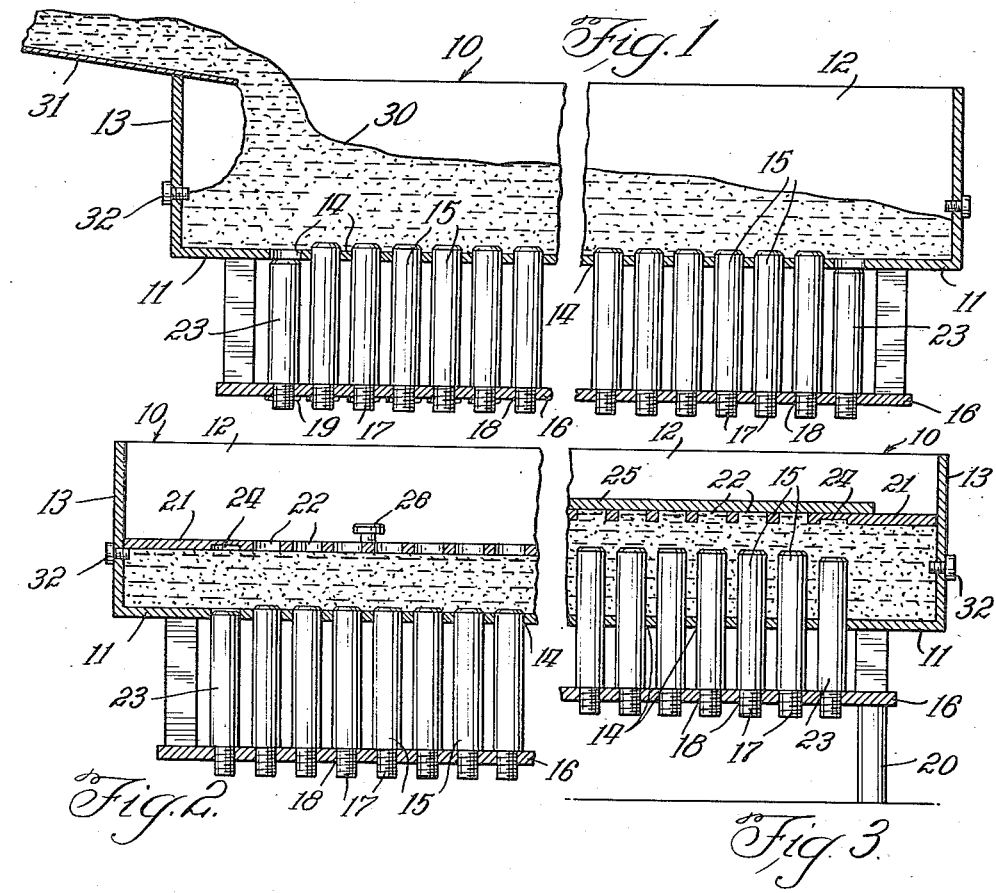
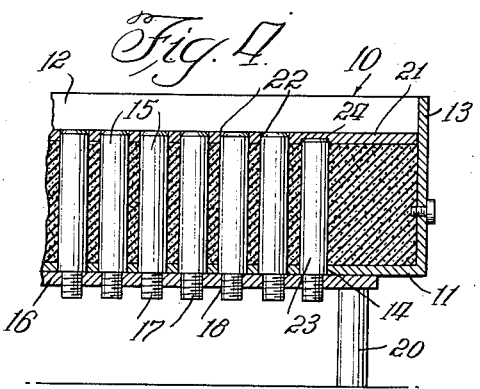
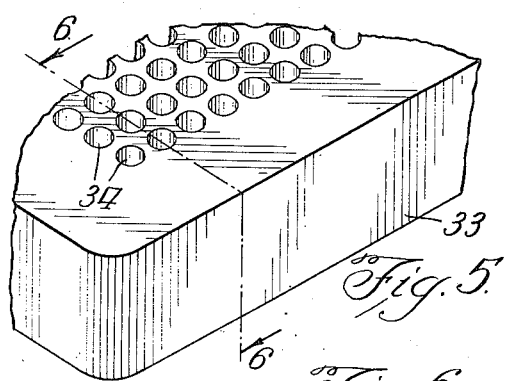
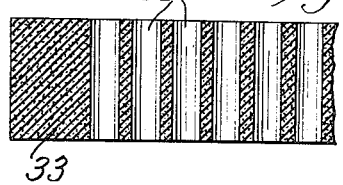
Inventor:
Marion Morgan Cunningham
By Eugene M. Giles  Atty.

Feb. 8, 1944.    M. M. CUNNINGHAM    2,341,499
MOLDING APPARATUS AND METHOD OF MOLDING
Filed April 18, 1942    2 Sheets-Sheet 2
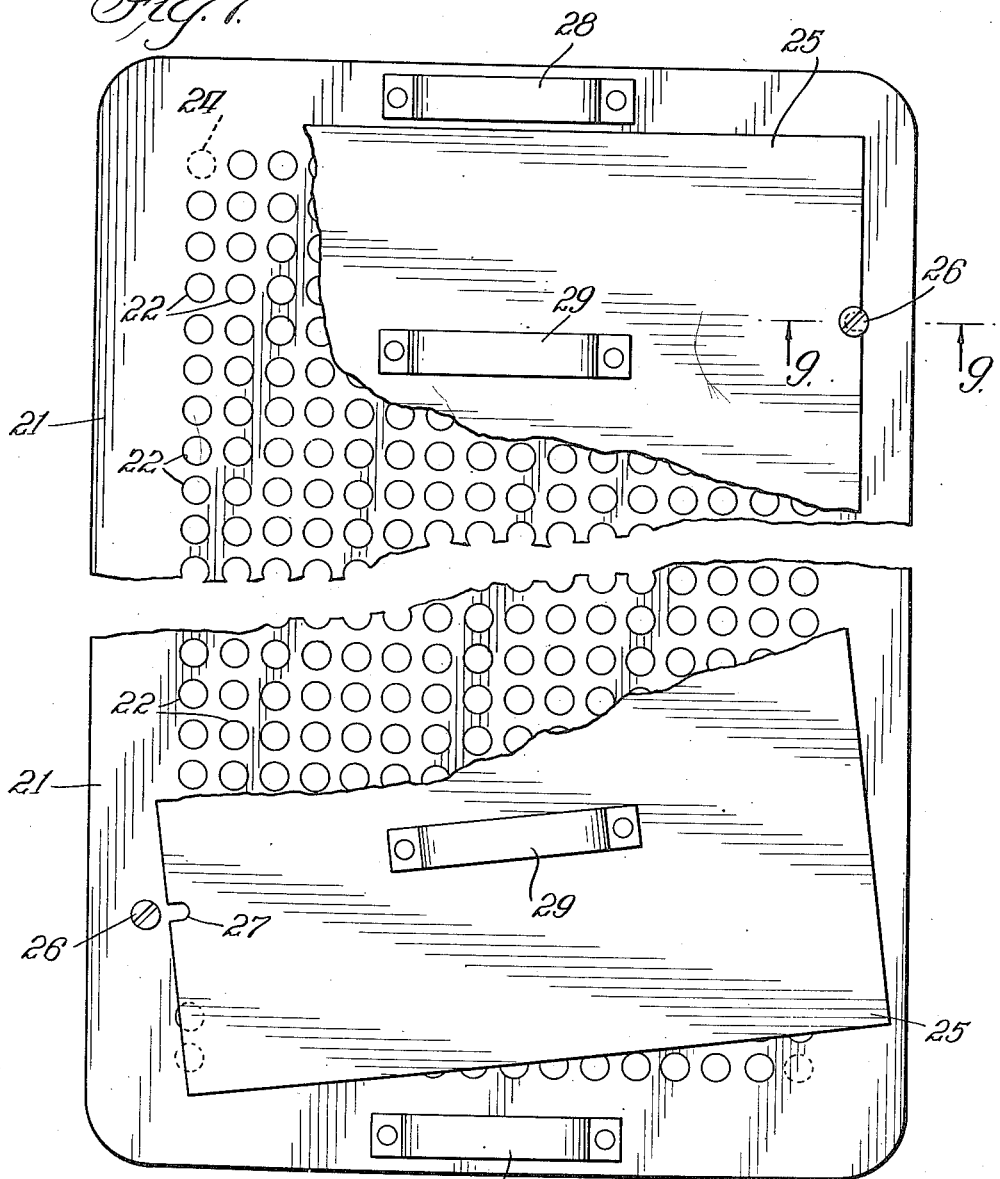
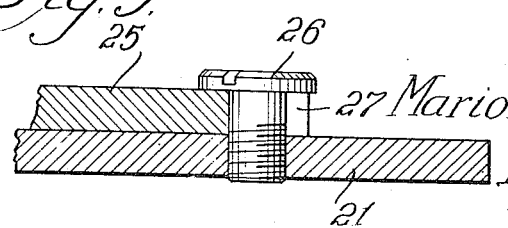
Inventor:
Marion Morgan Cunningham
By Eugene M. Giles
Atty Patented Feb. 8, 1944

2,341,499

UNITED STATES PATENT OFFICE 2,341,499

MOLDING APPARATUS AND METHOD OF MOLDING

Marion Morgan Cunningham, South Bend, Ind., assignor to Mishawaka Rubber and Woolen Manufacturing Company, Mishawaka, Ind., a corporation of Indiana Application April 18, 1942, Serial No. 439,476

9 Claims. (Cl. 18—34)

My invention relates to the molding of plastic materials such as foam sponge rubber and the like and refers more particularly to methods and apparatus for the forming of foam rubber articles and bodies having cored openings extending entirely therethrough in open ended fashion.

It has been the practice heretofore to mold foam rubber articles such as cushions, mattresses and the like in mold pans of the desired shape and to form cored openings in said articles by means of coring elements or mandrels, carried by the mold pan cover plate, which project downwardly into the molded mass and either approach or rest upon the bottom of the molding pan during the molding operation. One objection to this method and this type of equipment is that, inasmuch as the core elements do not extend clear through the molded mass, a layer of foam rubber is formed at the lower ends of the cored openings. Even when the coring elements contact the bottom of the molding pan during the molding operation a skin forms across the ends of the cored openings. This is objectionable because it prevents free passage of air through the body of the mattress or cushion.

Another difficulty experienced in molding these foam rubber articles is that when cover plates provided with coring elements are applied to the molding pans filled with foam rubber, and as the coring elements displace the foam rubber causing it to rise in the pan, air is entrapped in the molded mass and oftentimes does not escape therefrom even though vent holes are provided in the top plate for that purpose. The captive air which remains in the molded material causes recesses and cavities in the molded article and these imperfections make the article less satisfactory.

With prior molding equipment difficulty is often experienced in removing thick molded foam rubber articles from the mold cavity, owing to the tendency of such articles to cling to the coring elements after the molding operation is complete. Moreover, due to the fact that foam rubber is not a good conductor of heat, the coring elements in the usual molding equipment are insulated when encased in the foam, thus interfering with the transmission of heat into the interior of the molded mass through the medium of the coring elements.

With the view of overcoming the above and other objections to prior molding procedures and equipment it is an object of the present invention to provide improved methods and apparatus for manufacturing foam rubber articles, especially cushions, mattresses and the like, having cored openings extending therethrough; to enable the manufacture of such articles without air pockets such as are frequently caused by air trapped in the molding equipment; to facilitate the transmission of heat through the coring elements to the interior of the molded mass; and to provide convenient and simple means whereby the molded foam rubber articles may be stripped from the coring elements without injury to the articles.

With these and other objects in view the invention comprises the methods and novel combinations and arrangements of parts hereinafter fully described, illustrated in the accompanying drawings, and particularly pointed out in the appended claims, it being understood that the invention is not to be limited to the specific embodiments herein shown and described, but that various changes in the form, proportion and minor details of arrangement and procedure may be made, within the scope of the claims, without departing from the spirit of the invention or sacrificing any of the advantages thereof.

In the drawings:

Figure 1 is a side elevational view, partly in section, of molding apparatus embodying features of the present invention and showing, somewhat diagrammatically, the disposition of the component parts thereof in a preliminary stage of the molding operation.

Figure 2 is a similar view with the coring elements still retracted, the mold cavity filled with foam sponge rubber compound, and the cover plate in position thereon.

Figure 3 is a similar view showing the coring elements partly raised in the molding compartment and the cover plate and its lid supported thereabove by the frothed latex.

Figure 4 is a view, similar to Figure 3, showing the molding compartment filled and the mold parts in closed position ready for curing of the molded mass therewithin.

Figure 5 is a perspective view of a portion of a foam sponge rubber article manufactured in the present molding apparatus and in accordance with the procedure hereof.

Figure 6 is a cross sectional view substantially on the line 6—6 of Figure 5.

Figure 7 is a fragmentary plan view, with parts broken away, showing the top cover plate and lid of the mold hereof assembled in operative relation.

Figure 8 is a fragmentary plan view, similar to Figure 7, showing the procedure for attaching the lid to the cover plate.

Figure 9 is a sectional detail taken substantially on the line 9—9 of Figure 7.

Generally speaking, the invention hereof is embodied in a molding apparatus wherein a foam sponge rubber compound or the like is poured into a molding pan the coring elements of which have been retracted through and to the bottom thereof. When a predetermined quantity of frothed latex has been poured into the molding cavity, a cover plate is placed thereover and rests upon the frothed latex. This cover plate, resting upon the latex, holds it under pressure while the retracted coring elements are caused to rise up into the interior of the molding pan from the bottom. As these elements rise, thus displacing the frothed latex, the cover plate is caused to rise correspondingly. The cover plate is provided with openings or recesses into which the top of the coring elements extend when they have risen to their maximum height, and the top of the coring elements are exposed during curing of the frothed latex. When the molding and curing operations have been completed, the cover plate may be removed and the coring elements retracted, thus stripping the coring elements from the molded article and leaving such article in the molding pan.

When the cover plate is placed on top of the frothed latex in the molding pan, air is evacuated through openings in the top thereof until the plate rests upon the frothed latex and any surplus of such frothed latex may also escape through the openings. This arrangement prevents air from being trapped in the molding pan. As the coring elements rise into the openings in the cover plate the openings scrape off the frothed latex around the tops thereof owing to the close fit of the openings upon the coring elements thus preventing the formation of a skin across the ends of the cored openings of the molded article.

Referring in detail to the drawings, the molding pan is designated generally by the numeral 10 and consists of a floor or bottom 11 and side and end walls 12 and 13. The mold bottom 11 has openings 14 therein adapted to receive and snugly fit coring elements 15. The coring elements 15, which are preferably cylindrically shaped and fashioned of aluminum and which may be hollow or solid as desired, are mounted on a base 16 and are attached thereto by means of threaded extensions or shanks 17 which are screwed into the threaded openings 18. Cotter pins 19 may be inserted through suitable perforations in the threaded extensions in order to prevent accidental dislodgement or loosening of the coring elements 15. The base 16 may be supported on suitable legs 20, or in any other desired manner.

The top cover plate 21, is of a size and shape to fit within the four walls 11 and 12 of the molding pan 10. This cover plate is provided with openings 22 corresponding in arrangement and size to the openings 14 in the bottom 11 of the molding pan, said openings 22 being of only slightly larger diameter than the coring elements so as to fit the same very snugly. Certain coring elements 23, preferably at the four corners of the aggregation of coring elements 15, are slightly shortened in order to support the cover plate 21 at the proper level, and the plate 21 is provided at its corners with recesses 24 instead of openings, in order to receive the shorter coring elements 23 and rest thereupon. All of the coring elements 15 are preferably beveled around the tops thereof in order to facilitate entry thereof into the openings 22 in the cover plate 21. Likewise, the tops of the coring elements 23 are similarly beveled to guide them into the recesses 24 of the cover plate.

A lid 25 is provided and rests upon the top of the cover plate 21 so as to cover all of the openings 22 therein during the molding or casting operation. Clamping means secure the lid upon the cover plate 21 as shown in detail in Figures 7, 8, and 9. These means consist of mushroom-headed pins 26 on the cover plate 21 which cooperate with notches 27 in the lid 25. The lid is placed upon the cover plate 21 somewhat obliquely so that the notches 27 at opposite corners of the lid are in juxta-position to the pins 26 and so that a slight shifting of the position of the lid 25, for proper alignment of the lid with the cover plate 21, causes the notches 27 to engage the pins 26 and to be held in position thereby.

If desired the pins 26 may be screwthreaded into the cover plate, as seen in Figure 9, and adapted to be tightened when engaged in the notches 27 to hold the lid 25 firmly in place. In most instances, however, mere engagement of the notches by the pins 26 will hold the lid sufficiently securely. Also, the cover plate 21 and lid 25 may be provided with handles 28 and 29 respectively to facilitate handling.

In using the molding equipment of my invention in accordance with the procedure which I have developed, the first step is to pour a predetermined quantity of frothed latex as indicated at 30, from for instance, a trough 31, into the molding pan 10 while the coring elements 15 are in retracted position, as shown in Fig. 1. A sufficient quantity of frothed latex should be provided so that the top surface thereof just covers supporting bolts or set screws 32 which are threaded through the mold side and/or end walls to preliminarily support the cover plate 21. The cover plate is then placed on top of the quantity of frothed latex and is permitted to rest upon the supporting bolts 32 which are projected into the molding pan 10 just far enough to engage under the margins of the cover plate. The lid 25 is then placed on top of the cover plate 21 and is clamped in position as illustrated in Figures 7 and 8 heretofore described, thus closing the openings 22 in the cover plate 21 so that none of the frothed latex can escape during the next step.

The molding pan 10 is then moved downwardly or, conversely, the supporting plate 16 and its gang of coring elements raised, so that the coring elements 15 and 23 project upwardly into the molding pan 10 and rise in relation to the floor 11 thereof. The coring elements 15 and 23 rise until they enter the corresponding openings 22 and recesses 24 in the cover plate 21 and are in the position shown in Figure 4, at which time the lid 25 is then unclamped and removed. Owing to the fact that the coring elements 15 have now entered the openings 22 and thus prevent the escape of frothed latex therethrough, the cover plate 21 floats upon the frothed latex at its surface. Likewise the slightly shorter coring elements 23 are engaged in the recesses 24 and also serve to support the cover plate 21 at this level, although this arrangement of the shortened coring elements 23 and recesses 24 is not essential to my apparatus or the method which I have developed, owing to the ability of the frothed latex to support the cover plate 21 without mechanical assistance.

The frothed latex is then gelled and cured by the application of heat or in any other manner. It will be noted that the threaded extensions 17 of the coring elements protrude at the bottom of the molding equipment and the beveled top ends of the coring elements 15 are exposed in the openings 22 of the cover plate 21 so that the heating medium for vulcanization such as steam or heated air, is in direct contact therewith thus making for greatly improved transmission of heat through the coring elements 15 and into the body of the molded mass.

When vulcanization is completed, the cover plate 21 is removed from the body of molded foam rubber and the molding pan 10 is raised with respect to the coring elements 15 and 23, or the latter withdrawn downwardly, so that the coring elements are retracted to the floor 11 of the molding pan 10, thus stripping the cores from the molded mass.

The molded foam rubber article may then be removed from the molding pan 10 quite conveniently as the coring elements have already been withdrawn. The resultant article is a foam rubber mattress, cushion or the like, 33, as illustrated in Figures 5 and 6, with cored openings 34 extending entirely therethrough and unmarred by any film or skin formation at the ends of the cored openings. Beyond the merit of such an article from the standpoint of betterment in ventilation when in use, the provision of the entirely unobstructed openings 34 brings out a manufacturing advantage—that of permitting the articles, after stripping from the mold, to be dried more quickly by the use of forced circulation of hot air through the unobstructed openings 34.

Moreover, the molding equipment hereof itself possesses inherent mechanical advantages. Thus, stripping of the vulcanized article is facilitated due to the free yet parallel stripping movements in the mold and coring assembly permitting, if desired, the coring elements or mandrels 15 and 23 to be placed as close together as ⅛ inch and yet have the stripping action function satisfactorily.

A still further advantage of the molding arrangement hereof is that, due to the floating cover plate 21, articles of different thickness may be made in the equipment simply by varying the amount or volume of frothed latex or other plastic material introduced into the mold.

While I have shown and described my invention in a preferred form, I am aware that various modifications can be made without departing from the spirit of my invention, the scope of which is to be determined by the appended claims.

What is claimed is:

1. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, and a base supporting said mandrels in alignment with said openings, said mandrels being insertible into and withdrawable from said mold cavity through said openings, as and for the purpose described, said mold pan having a cover telescopically insertible in the cavity to provide between the cover and mold pan bottom a mold space of variable depth and said cover having openings which accommodate the upper ends of the elevated mandrels so that the latter extend entirely through the mold space.

2. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, said mandrels being insertible into and withdrawable from said mold cavity through said openings, and a cover plate fitting within the walls of said cavity, said plate having openings therethrough arranged and adapted to receive the upper ends of said mandrels when the same are positioned in said cavity, as and for the purpose described.

3. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, a base supporting said mandrels in alignment with said openings, said mandrels being insertible into and withdrawable from said mold cavity through said openings, and a cover plate fitting within the walls of said cavity, said plate having openings therethrough arranged and adapted to receive the upper ends of said mandrels when the same are positioned in said cavity, as and for the purpose described.

4. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, a base supporting said mandrels in alignment with said openings, said mandrels being insertible into and withdrawable from said mold cavity through said openings, a cover plate fitting within the walls of said cavity, said plate having openings therethrough arranged and adapted to receive the upper ends of said mandrels when the same are positioned in said cavity, and an imperforate lid for said cover plate.

5. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, certain of said mandrels being shorter than the others, a base supporting said mandrels in alignment with said openings, said mandrels being insertible into and withdrawable from said mold cavity through said openings, and a cover plate fitting within the walls of said cavity, said plate having openings therethrough arranged and adapted to receive the upper ends of the longer of said mandrels when the same are positioned in said cavity, the said shorter mandrels engaging said cover plate to support the same in spaced relation with respect to the mold bottom.

6. Molding apparatus of the character described comprising, a mold pan having a cavity defined by a bottom and upstanding side walls, said bottom being provided with a plurality of openings therethrough, a plurality of upstanding mandrels receivable in said openings in relatively close fitting relationship therewith, certain of said mandrels being shorter than the others, a base supporting said mandrels in alignment with said openings, said mandrels being insertible into and withdrawable from said mold cavity through said openings, and a cover plate fitting within the walls of said cavity, said plate having openings therethrough arranged and adapted to receive the upper ends of the longer of said mandrels when the same are positioned in said cavity, and also having recesses arranged and adapted to be engaged by the said shorter mandrels for supporting said cover plate in spaced relation with respect to the mold bottom.

7. The method of making molded vulcanized articles of foam rubber or the like which comprises, introducing the starting material in predetermined quantity into a mold having mandrels retractible through the bottom thereof while the mandrels are so retracted, placing upon the surface of the material a floating cover, raising the mandrels into and through the material within the mold so that the upper ends of the mandrels engage the cover, subjecting the mold and contents to a vulcanizing atmosphere to cure the mold contents, and thereafter retracting the mandrels from the vulcanized article and stripping the same from the mold.

8. The method of making molded vulcanized articles of foam rubber or the like which comprises, introducing the starting material in predetermined quantity into a mold having mandrels retractible through the bottom thereof while the mandrels are so retracted, placing upon the surface of the material a floating cover having openings therein registerable with said mandrels, raising the mandrels into the material within the mold until the upper ends of the mandrels enter the said openings in the cover, subjecting the mold and contents to a vulcanizing atmosphere to cure the mold contents, and thereafter retracting the mandrels from the vulcanized article and stripping the same from the mold.

9. The method of making molded vulcanized articles of foam rubber or the like which comprises, introducing the starting material in predetermined quantity into a mold having mandrels retractible through the bottom thereof while the mandrels are so retracted, placing upon the surface of the material a floating cover having openings therein registerable with said mandrels and having a lid covering said openings, raising the mandrels into the material within the mold until the upper ends of the mandrels enter the said openings in the cover, removing the lid to expose the upper ends of said mandrels, subjecting the mold and contents to a vulcanizing atmosphere to cure the mold contents, and thereafter retracting the mandrels from the vulcanized article and stripping the same from the mold.

MARION MORGAN CUNNINGHAM.